United States Patent
Yu

(10) Patent No.: US 6,191,966 B1
(45) Date of Patent: Feb. 20, 2001

(54) PHASE CURRENT SENSOR USING INVERTER LEG SHUNT RESISTOR

(75) Inventor: Zhenyu Yu, Sugarland, TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/468,252

(22) Filed: Dec. 20, 1999

(51) Int. Cl.$^7$ ............................. H02M 3/24; H02M 5/42; H02M 7/537
(52) U.S. Cl. ............................ 363/98; 363/131; 363/40
(58) Field of Search ............................ 363/98, 97, 131, 363/40, 17, 41

(56) References Cited

U.S. PATENT DOCUMENTS

| | | | |
|---|---|---|---|
| 4,050,006 | * | 9/1977 | Stich ........................................ 363/98 |
| 4,609,983 | * | 9/1986 | Braun ....................................... 363/98 |
| 4,907,144 | * | 3/1990 | Tuusa ....................................... 363/37 |
| 5,043,857 | * | 8/1991 | Kirchberg, Jr. et al. ............... 363/41 |
| 5,343,382 | * | 8/1994 | Hale et al. .............................. 363/98 |
| 5,438,502 | * | 8/1995 | Rozman et al. ....................... 363/35 |
| 5,448,156 | * | 9/1995 | Tsay ...................................... 323/312 |
| 5,581,452 | * | 12/1996 | Yamamoto .............................. 363/41 |
| 5,627,447 | * | 5/1997 | Unsworth et al. .................... 318/801 |
| 5,696,431 | * | 12/1997 | Giannopoulos et al. ............ 315/308 |
| 5,952,794 | * | 9/1999 | Bergman et al. ..................... 315/307 |
| 5,969,958 | * | 10/1999 | Nielsen et al. ......................... 363/41 |
| 6,049,474 | * | 4/2000 | Platnic .................................. 363/98 |

* cited by examiner

*Primary Examiner*—Peter S. Wong
*Assistant Examiner*—Bao Q. Vu
(74) *Attorney, Agent, or Firm*—J. Dennis Moore; Wade James Brady, III; Frederick J. Telecky, Jr.

(57) ABSTRACT

A method for use in a pulse width modulation controlled voltage-source inverter having one or more legs, each leg including two transistors coupled serially between the terminals of a power source and providing a respective drive output, each leg further including a shunt resistor between one of the two transistors, denominated the lower transistor, and one of the terminals, in which control pulses are applied to each leg during a sequence of pulse periods. The method is for determining the phase current each leg supplies, and includes the following steps. The voltages are sampled across the shunt resistor in a plurality of sample periods. The voltages so sampled are averaged over the sample periods, and the phase current is determined from the average so derived.

8 Claims, 2 Drawing Sheets

PHASE CURRENT SENSOR USING INVERTER LEG SHUNT RESISTOR

TECHNICAL FIELD OF THE INVENTION

This invention relates to three-phase voltage-source inverters, and more particularly relates to a method and apparatus for sensing phase current with shunt resistors on inverter legs.

BACKGROUND OF THE INVENTION

Pulse width modulation (PWM) techniques are used to control voltage-source inverters (VSI), in applications such as control of DC brushless, AC induction and permanent-magnet synchronous motors, and other loads. Three-phase (3φ) VSIs are common, but VSIs have configurations for different numbers of phases, and PWM techniques are used to control such systems, as well. PWM inverters make it possible to control both the frequency and magnitude of the voltage and current applied to a load, such as a motor for example. As a result, PWM inverter-powered motor drives offer better efficiency and higher performance compared to fixed frequency motor drives. The energy that a PWM inverter delivers to a load is controlled by PWM signals applied to the gate of the power transistors.

Several PWM techniques are known and used in the art, for determining the modulating signal and the switch-on/switch-off instants from the modulating signal. Currently popular examples are sinusoidal PWM, hysteric PWM, and space-vector (SV) PWM. These techniques are used for control of AC induction, Brushless DC (BLDC) and switched reluctance (SR) motors.

PWM can be either symmetric, or asymmetric, as shown in FIG. 1. In FIG. 1 two pulse waveforms 10 and 12, are shown for four contiguous, equal periods. The top waveform 10 in the figure is an example of an asymmetric PWM, in which the timing for the leading edge in each period varies, as shown by arrow 14, while the trailing edge always coincides with the end of the period. The bottom waveform 12 in the figure is an example of a symmetric PWM, in which the timing for both the leading edge and the trailing edge is varied by the same amount in opposite directions, as shown by arrows 16 and 18, respectively, resulting in symmetry for the waveform in every period.

A circuit diagram of a typical 3φ VSI 20 is shown in FIG. 2. A DC voltage, $V_{DC}$, is provided between a $V+_{BUS}$ 22 and a $V-_{BUS}$ 24. Three legs are connected between bus 22 and bus 24. The first leg includes a power transistor Q1 having its collector connected to bus 22, and a power transistor Q2 having its collector connected to the emitter of transistor Q1 and having its emitter connected to bus 24. A diode D1 is connected between the emitter and collector of transistor Q1, and a diode D2 is connected between the emitter and collector of transistor Q2. In both cases the cathode of the diode is connected to the collector of the transistor. A control signal a is provided on line 26 to the base of transistor Q1, while a control signal a' is provided on line 28 to the base of transistor Q2. The common connection point of transistors Q1 and Q2 is connected to line 38, which carries the output voltage $V_a$ and supplies the phase current $i_a$ of the first leg.

The other two legs are of the same structure as the first leg. Thus, the second leg includes a power transistor Q3 having its collector connected to bus 22, and a power transistor Q4 having its collector connected to the emitter of transistor Q3 and having its emitter connected to bus 24. A diode D3 is connected between the emitter and collector of transistor Q3, and a diode D4 is connected between the emitter and collector of transistor Q4. In both cases the cathode of the diode is connected to the collector of the transistor. A control signal b is provided on line 30 to the base of transistor Q3, while a control signal b' is provided on line 32 to the base of transistor Q4. The common connection point of transistors Q3 and Q4 is connected to line 40, which carries the output voltage $V_b$ and supplies the phase current $i_b$ of the second leg.

Similarly, the third leg includes a power transistor Q5 having its collector connected to bus 22, and a power transistor Q6 having its collector connected to the emitter of transistor Q5 and having its emitter connected to bus 24. A diode D5 is connected between the emitter and collector of transistor Q5, and a diode D6 is connected between the emitter and collector of transistor Q6. In both cases the cathode of the diode is connected to the collector of the transistor. A control signal c is provided on line 34 to the base of transistor Q5, while a control signal c' is provided on line 36 to the base of transistor Q6. The common connection point of transistors Q5 and Q6 is connected to line 42, which carries the output voltage $V_C$ and supplies the phase current $i_c$ of the third leg.

In operation, when an upper transistor, Q1, Q3 or Q5, is turned on, i.e., when a, b or c is 1, the corresponding lower transistor, Q2, Q4, or Q5, is switched off, i.e., the corresponding a', b' or C' is 0.

In operating a VSI, such as 3φ VSI 20 of FIG. 2, it is important to control the phase currents, e.g. to control the torque and speed of a motor under control of the VSI. Therefore, it is important to know the phase currents.

The easiest way in which to monitor phase current is with a transformer coupled circuit. A hall effect sensor is typically used when this type of monitoring is chosen. However, such monitors are costly, requiring typically a transformer and separate integrated circuit. In addition, the signal output of such monitors requires a linear amplifier, which adds design complexity and further cost.

Another approach uses a so-called shunt resistor. An example of this is shown in FIG. 3, which is a diagram of the second, Q3, Q4 leg of the 3φ VSI 20 of FIG. 2, having the shunt resistor $R_S$, connected between the base of transistor Q4 and $V-_{BUS}$ 24. Each of the three legs is provided with such a resistor. In using this technique the voltage $v_S$ across $R_S$ is measured when transistor Q4 is on, and Ohms Law applied to derive the current is through resistor $R_S$. Now, the duty cycle of the particular leg determines the amount of time that the lower transistor in that leg, e.g., transistor Q4, is on. Ignoring dead band effects, if the duty cycle of a leg is d, expressed as a decimal quantity with a 0% duty cycle being represented as 0 and a 100% duty cycle being represented as 1.0, and the PWM period being represented as $T_{PWM}$, then the upper transistor is on $d*T_{PWM}$, and the lower transistor is on $(1-d)*T_{PWM}$.

It is necessary for the width of the lower leg pulse, or, sampling interval, to be sufficiently long to have a "good" sample to measure. This is because reactive components at the base of the lower leg transistor will subject the voltage at that node to a time constant factor, delaying the achievement of the full voltage, causing ringing, and the like. The dead band included to prevent shoot through fault also reduces the effective sampling interval. Thus, the pulse width must be sufficiently long to take into account the dead band and still allow the measured voltage to settle, and thus correspond to the true motor phase current.

One prior art approach to dealing with this problem has been to "over-design" the inverter, so that the on time for the lower transistor e.g., transistor Q4, is never smaller than a lower bound. In other words, the inverter components are designed to provide a high enough voltage so that the upper transistor in any leg is never on for such a high portion of a PWM period that the lower transistor is on for such a short time that a good sample of the voltage $V_S$ cannot be taken.

However, even with an over-designed inverter, the direct approach of sampling the phase current when the lower transistor is on results in noise problems, because of the high dv/dt and di/dt caused by the switching of the high voltages and high currents in a PWM inverter. The high dv/dt and di/dt not only cause the voltage across the shunt resistor to have spikes, but also inject noise into the entire shunt output sampling circuit.

It is therefore an object of the present invention to provide a low cost solution to inverter phase current sensing that reduces noise in sensed phase current and does not require over-design of the inverter.

SUMMARY OF THE INVENTION

The present invention provides a method for use in a pulse width modulation controlled voltage-source inverter having one or more legs, each leg including two transistors coupled serially between the terminals of a power source and providing a respective drive output, each leg further including a shunt resistor between one of the two transistors, denominated the lower transistor, and one of the terminals, in which control pulses are applied to each leg during a sequence of pulse periods. The method is for determining the phase current each leg supplies, and includes the following steps. The voltages are sampled across the shunt resistor in a plurality of sample periods. The voltages so sampled are averaged over the sample periods, and the motor phase current is determined from the average so derived.

These and other features of the invention will be apparent to those skilled in the art from the following detailed description of the invention, taken together with the accompanying drawings.

DETAILED DESCRIPTION OF THE DRAWINGS

In accordance with the preferred embodiment of the present invention the average of the current is, that is, $\overline{i_S}$, is obtained and used to determine the phase current. This will now be explained.

Figure 1:
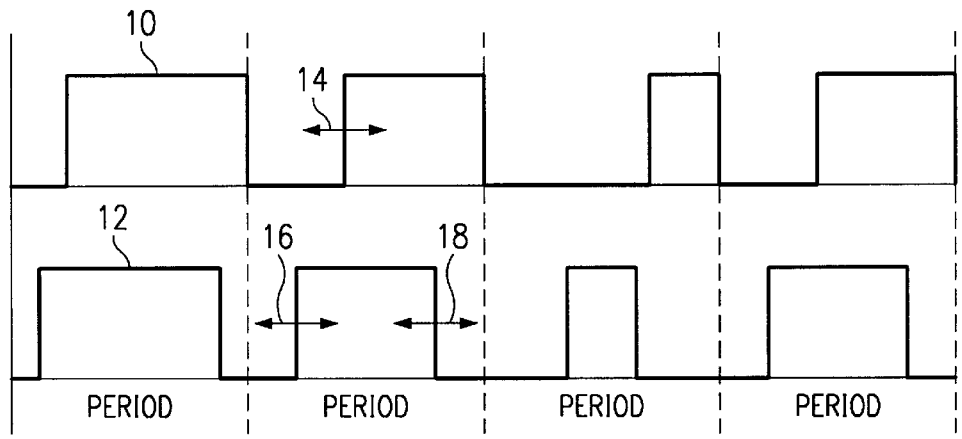
FIG. 1 is a signal diagram showing symmetric and asymmetric pulses for a prior art pulse width modulation scheme.
Figure 2:
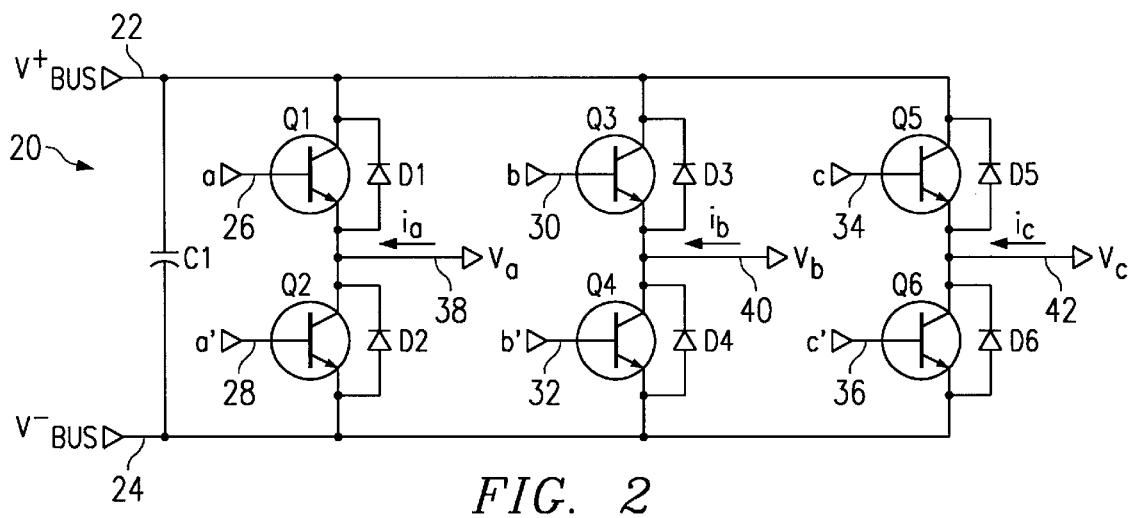
FIG. 2 is a circuit diagram of a typical prior art 3φ VSI.
Figure 3:
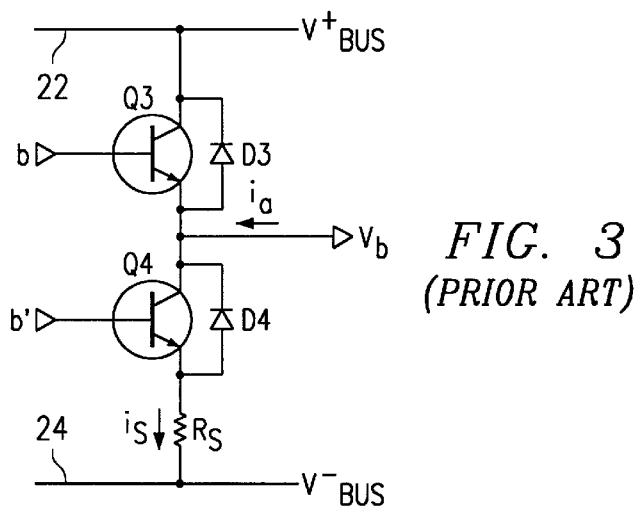
FIG. 3 is a diagram of a leg of a VSI, such as the 3100 VSI shown in FIG. 2.
Figure 4:
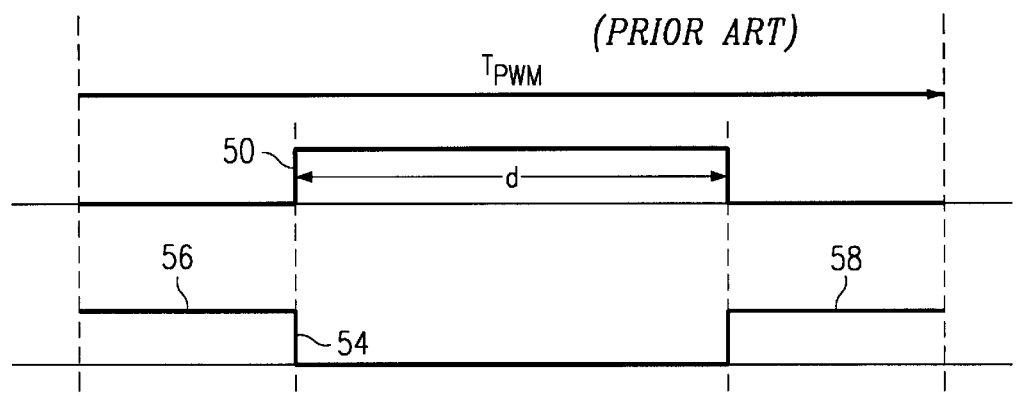
FIG. 4 is a signal diagram showing a plot of motor phase current over time for a leg of a 3φ VSI.

FIG. 4 is a diagram showing the top transistor current waveform patterns 50 for a leg of VSI, and showing the waveform pattern 54 for the current flowing through the lower transistor of that leg, again during a complete PWM period, $T_{PWM}$. The well known, overlap-preventing dead band is omitted from the waveforms in the interest of simplicity and clarity of presentation. As mentioned above, the duty cycle is d, expressed as a decimal quantity with a 0% duty cycle being represented as 0 and a 100% duty cycle being represented as 1.0. Thus, the upper transistor is on $d*T_{PWM}$, and the lower transistor is on $(1-d)*T_{PWM}$. Current having a magnitude $i_a$ flows through the shunt resistor during the portions of the PWM period in which the upper transistor is off. In the diagram it can be seen that the phase current flows through the shunt resistor during two periods, 56 and 58. Now, assume that the PWM frequency is high enough such that $i_a$ can be considered as constant. According to Shanon's Sampling Theorem, also referred to as the Nyquist Sampling Theorem, this is true of the PWM frequency is more than 2 times (usually 5–10 times) higher than the load-dependent highest natural frequency of the phase current. In such case, for every PWM period the average of the current $i_S$ (FIG. 3), that is, $\overline{i_S}$, can be expressed as:

$$\overline{i_S} = (1-d)i_a. \qquad \text{Equation (3)}$$

Thus, $$i_a = \frac{\overline{i_S}}{1-d} = \frac{\overline{i_S}}{d'}, \qquad \text{Equation (4)}$$

where $d'=1-d$ and is referred to as the inverse duty cycle.

Figure 5:
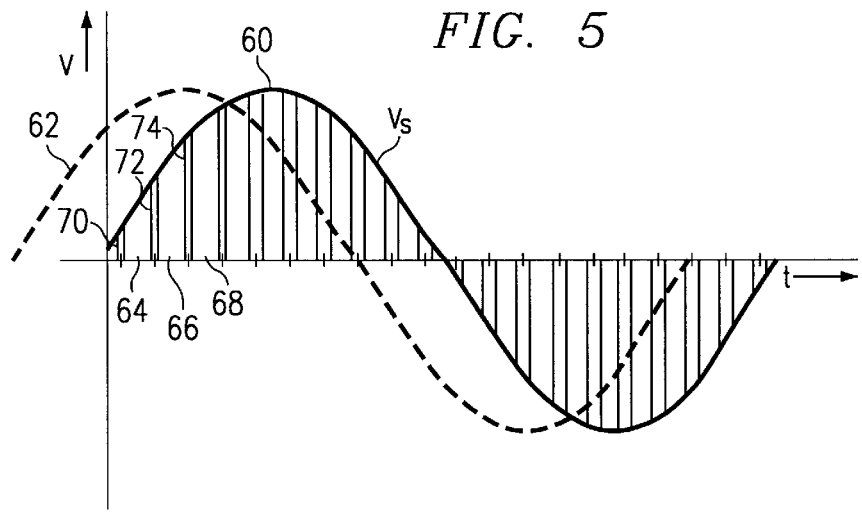
FIG. 5 is a diagram showing the top transistor current waveform patterns for a VSI leg, and showing the current flowing through the lower transistor of that leg during a full fundamental electrical period.
Figure 6:
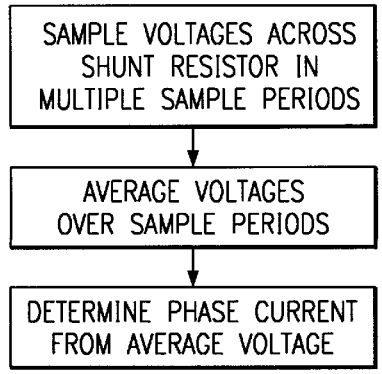
FIG. 6 is a flow chart illustrating a method for determining a phase current in accordance with the present invention.
Figure 7:
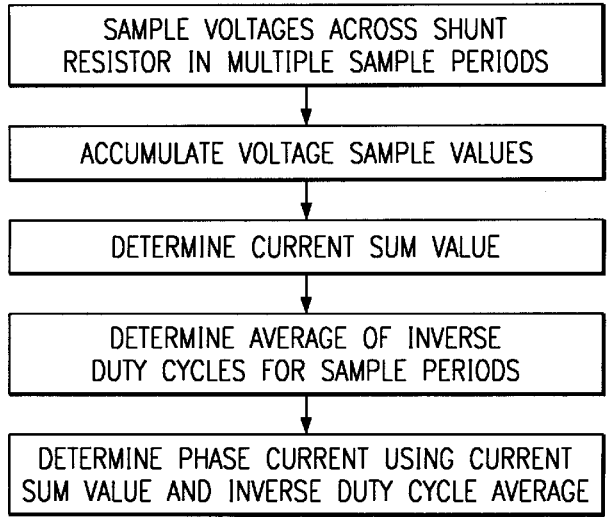
FIG. 7 is a block diagram illustrating a system for providing pulse width modulation control in accordance with the present invention.

FIG. 5 is a signal diagram showing a plot 60 of $i_S$, which corresponds to phase current as described hereinabove, over time for a leg of a 3φ VSI. Superimposed on the diagram is a plot 62 of the inverter output voltage for the same leg. The waveforms for both plot 60 and plot 62 are shown to be sinusoidal for the purposes of discussion herein, but the present invention is not limited to sinusoidal voltage or current. The horizontal axis represents time, while the vertical axis represents voltage or current, depending on the plot. Note the phase shift of plot 60 with respect to plot 62 due to the load reactance. The horizontal axis is divided into equal duration periods 64, 66, 68, etc., which represent the PWM periods. The $i_S$ plot 60 is divided into pulses 70, 72, 74, etc., which correspond to the PWM pulses actually generated by the lower transistor of the leg. The widths of the pulses 70, 72, 74, etc., vary in accordance with the particular PWM technique utilized, being narrowest (i.e., shortest) at the positive peak of the inverter output voltage 62, and being widest (i.e., longest) at the negative peak of the inverter output voltage 62, as can be seen in the figure.

The problem solved by the present invention is the avoidance of inaccurate determination of the voltage during any of the pulses 70, 72, 74, etc., even when such pulses are very short, due to a high duty cycle for that pulse (upper transistor is on for a long time, lower transistor is on for a short time), and are noisy, due to the high dv/dt and di/dt caused by the switching of high voltage and current.

As mentioned above, in accordance with the principles of the present invention, the average of the current $i_S$, that is, $\overline{i_S}$, is obtained and used to determine the phase current. This may be done readily using a digital signal processor (DSP), although the invention is not limited to applications using a DSP. The way in which this is done in the preferred embodiment of the present invention is as follows.

Let N be a number of PWM periods. Let $M_k$, k=1, 2, 3, . . . N, be the number of samples of $i_S$ taken in PWM period k, and let $d_k$, k=1, 2, 3, . . . N, be the corresponding duty cycles of those periods. Further, let $i_{ak}$, k=1, 2, 3, ... N, represent the phase current, let $i_{sq}$, q=1, 2, ... Nk represent the samples of $i_S$, and let $\overline{i_{sk}}$, k=1, 2, 3, ... N, represent the corresponding average currents. Then the average of is for PWM period k can be expressed as:

$$\overline{i_{sk}} = \frac{1}{Mk} \sum_{q=1}^{Mk} i_{sq}, k = 1, 2, \ldots N.$$ Equation(5)

Thus, based on Equation (4):

$$\sum_{k=1}^{N} \overline{i_{sk}} = \sum_{k=1}^{N} \frac{1}{Mk} \sum_{q=1}^{Mk} i_{sq} = \sum_{k=1}^{N} (1-d_k) * i_{ak} = \sum_{k=1}^{N} d'_k * i_{ak},$$ Equation(6)

where $d_k' = 1-d_k$, the inverse duty cycle for PWM period k.

When the sampling frequency, which is now PWM frequency divided by N, is 5–10 or more times higher than the highest natural frequency of the phase current, $i_{ak}$ can further be considered to be constant for the N periods, i.e, $i_{ak}=i_a$, k=1, 2, ... N. Also, for practical purposes, assume the number of samples taken in a PWM period is the same for all PWM periods, i.e., Mk=M, k=1, 2, ... N, which is considered preferred.
Then:

$$\sum_{k=1}^{N} \overline{i_{sk}} = \frac{1}{M} \sum_{k=1}^{N} \sum_{q=1}^{M} i_{sq} = i_a \sum_{k=1}^{N} d'_k,$$ Equation(7)

or, $$\frac{1}{N} \sum_{k=1}^{N} \overline{i_{sk}} = \frac{1}{N \cdot M} \sum_{k=1}^{N} \sum_{q=1}^{M} i_{sq} = i_a \frac{1}{N} \sum_{k=1}^{N} d'_k$$ Equation(8)

(note that N is used here for discussion, but is not needed in actual implementations), where $$\overline{i_{sN}} = \frac{1}{N} \sum_{k=1}^{N} \overline{i_{sk}} = \frac{1}{N \cdot M} \sum_{k=1}^{N} \sum_{q=1}^{M} i_{sq}$$ Equation(9)

is the average shunt current for the N periods.
Let $$\overline{d'_N} = \frac{1}{N} \sum_{k=1}^{N} d'_k$$ Equation(10)

be the average value of $d_k'$, k=1, 2, 3, ... N, i.e., the average inverse duty cycle, over the N periods.
From Equation (9) a sample of phase current is obtained as:

$$i_a = \frac{\overline{i_{sN}}}{\overline{d'_N}}$$ Equation(11)

In accordance with the preferred embodiment of the present invention the based on Ohm's Law, multiple times per PWM period, based on which $\overline{i_S}$ and/or $\overline{i_{sN}}$, and finally $i_a$ are calculated using the above equations.

In actual implementations, N, i.e., the number of PWM periods over which the shunt voltage samples are taken and the averages of the shunt current and inverse duty cycles are calculated to reconstruct a phase current sample, $i_a$ must be chosen such that Shanon's Sampling Theorem holds, i.e., the sampling frequency of phase current $i_a$, which is PWM frequency divided by N, must be more than 2 times (usually 5–10 times) the load-dependent highest natural frequency of the phase current. Also, the number of samples taken per PWM period, M, must be large enough so that $$\frac{1}{M} \sum_{q=1}^{M} i_{sq}$$

is a sufficiently accurate average of $i_S$ for that PWM period, $$\frac{1}{N \cdot M} \sum_{k=1}^{N} \sum_{q=1}^{M} i_{sq}$$

is a sufficiently accurate average of $i_S$ over the N PWM periods, and $$\frac{1}{N} \sum_{k=1}^{N} d'_k$$

is a sufficiently accurate average of $d_k'$ over the same N PWM periods, for desired system performance.

The clear advantages of taking an average of samples over a number of PWM periods are that noise is filtered in the sampled data, and that the problem of dividing by zero in calculating the averages when the duty cycle gets close to 1.0, i.e., when d' gets close to 0.0, is alleviated.

Although the present invention and its advantages have been described in detail, it should be understood that various changes, substitutions and alterations can be made herein without departing from the spirit and scope of the invention as defined by the appended claims.

What is claimed is:

1. In a pulse width modulation controlled voltage-source inverter having one or more legs, each leg including two transistors coupled serially between the terminals of a power source and providing a respective drive output, each leg further including a shunt resistor between one of said two transistors, denominated the lower transistor, and one of said terminals, in which control pulses are applied to each leg during a sequence of pulse periods, a method for determining the phase current for each leg, comprising the steps of:
    sampling the voltage across said shunt resistor in a plurality of sample periods; and
    averaging the voltages so sampled over said sample periods, and determining the phase current from the average so derived.

2. In a pulse width modulation controlled voltage-source inverter having one or more legs, each leg including two transistors coupled serially between the terminals of a power source and providing a respective drive output, each leg further including a shunt resistor between one of said two transistors, denominated the lower transistor, and one of said terminals, in which control pulses are applied to each leg during a sequence of pulse periods, a method for determining the phase current for a leg, comprising the steps of:
    sampling the voltage across said shunt resistor for said leg in a plurality of sample periods to obtain a corresponding plurality of voltage sample values;
    accumulating the sum of said plurality of voltage sample values, to obtain a voltage sum value;

determining a corresponding sum value for the current through said shunt resistor, using Ohm's Law;

determining the average of the inverse duty cycles for said leg for said plurality of sample periods; and determining the phase current for each leg by dividing said current sum value by said inverse duty cycle average.

3. A method according to claim 2, wherein said step of sampling is performed such that the frequency of said sample periods is more than two times the load-dependent highest natural frequency of the phase current.

4. A system for providing pulse width modulation control, comprising:

a voltage-source inverter circuit operable to drive a multi-phase component;

a phase current detection circuit associated with the voltage-source inverter circuit, and adapted to provide a voltage related to a phase current of the multi-phase component; and a processor adapted to sample the voltage of the phase current detect circuit over a plurality of sample periods and use the sampled voltage to determine an average phase current for use in the control of the voltage-source inverter circuit.

5. The system of claim 4, wherein the phase current detection circuit comprises a shunt resistor associated with one or more legs of the voltage-source inverter circuit, and wherein a phase current of the multi-phase component is related to a voltage across the shunt resistor.

6. The system of claim 4, wherein the multi-phase component comprises a three-phase motor, and wherein the phase current corresponds to one of the phases of the three-phase motor.

7. The system of claim 4, wherein the processor comprises a digital signal processor.

8. The system of claim 7, wherein the digital signal processor is adapted to sample the voltage of the phase current detect circuit at a frequency which is at least two times greater than a highest natural frequency of the phase current.

* * * * *